(12) United States Patent
Kim

(10) Patent No.: US 7,987,950 B2
(45) Date of Patent: Aug. 2, 2011

(54) SINGLE MOTOR ELECTRO WEDGE BRAKE SYSTEM USING SOLENOID MECHANISM FOR IMPLEMENTING ADDITIONAL FUNCTIONS

(75) Inventor: Jongsung Kim, Seoul (KR)

(73) Assignee: Hyundai Mobis Co., Ltd., Seoul (KR)

( * ) Notice: Subject to any disclaimer, the term of this patent is extended or adjusted under 35 U.S.C. 154(b) by 892 days.

(21) Appl. No.: 11/877,122

(22) Filed: Oct. 23, 2007

(65) Prior Publication Data

US 2008/0314695 A1 Dec. 25, 2008

(30) Foreign Application Priority Data

Jun. 25, 2007 (KR) ........................ 10-2007-0062110

(51) Int. Cl.
*F16D 55/16* (2006.01)
*F16D 65/14* (2006.01)
(52) U.S. Cl. ..................... 188/71.9; 188/72.2; 188/72.7; 188/196 BA
(58) Field of Classification Search ................ 188/71.7, 188/71.8, 71.9, 72.2, 72.7, 196, 196 BA, 188/196 V, 265
See application file for complete search history.

(56) References Cited

U.S. PATENT DOCUMENTS

| | | | |
|---|---|---|---|
| 4,553,643 A * | 11/1985 | Wilcox | 188/71.9 |
| 6,305,506 B1 * | 10/2001 | Shirai et al. | 188/72.2 |
| 6,728,614 B2 | 4/2004 | Matsubara et al. | |
| 6,978,868 B2 | 12/2005 | Schautt | |
| 2003/0183790 A1 | 10/2003 | Ji et al. | |
| 2004/0011981 A1 | 1/2004 | Ahn | |
| 2004/0013549 A1 | 1/2004 | Ahn | |
| 2004/0262101 A1 | 12/2004 | Baumann et al. | |
| 2005/0034939 A1 | 2/2005 | Kramer | |
| 2005/0167212 A1 * | 8/2005 | Pascucci et al. | 188/72.2 |
| 2006/0112995 A1 | 6/2006 | Kwon | |
| 2007/0114843 A1 | 5/2007 | Kawahara et al. | |
| 2008/0210498 A1 | 9/2008 | Baumgartner et al. | |
| 2008/0314694 A1 * | 12/2008 | Park | 188/72.7 |

FOREIGN PATENT DOCUMENTS

| | | |
|---|---|---|
| DE | 102005030620 | 4/2006 |
| WO | 2006/040007 | 4/2006 |

OTHER PUBLICATIONS

U.S. Appl. No. 11/934,183 to Kim, filed Nov. 2, 2007.

* cited by examiner

*Primary Examiner* — Thomas J Williams

(74) *Attorney, Agent, or Firm* — Greenblum & Bernstein P.L.C.

(57) ABSTRACT

The present invention provides an electro wedge brake (EWB) system that implements a main braking function by using power generated by one motor. Further, the electro wedge brake system implements various additional functions such as a function for maintaining a set clearance of a pad, a Fail-Safe function, and an EPB function, by using that the forward movement of a push rod shaft screwed using a NSL (Non-Self Locking) type screw is restrained or released on the basis of ON/OFF control of the solenoid mechanism interlocked with the main braking function motor. Accordingly, since only one motor is used to generate power, it is possible to reduce the number of parts and to simplify the structure.

24 Claims, 12 Drawing Sheets

FIG.2
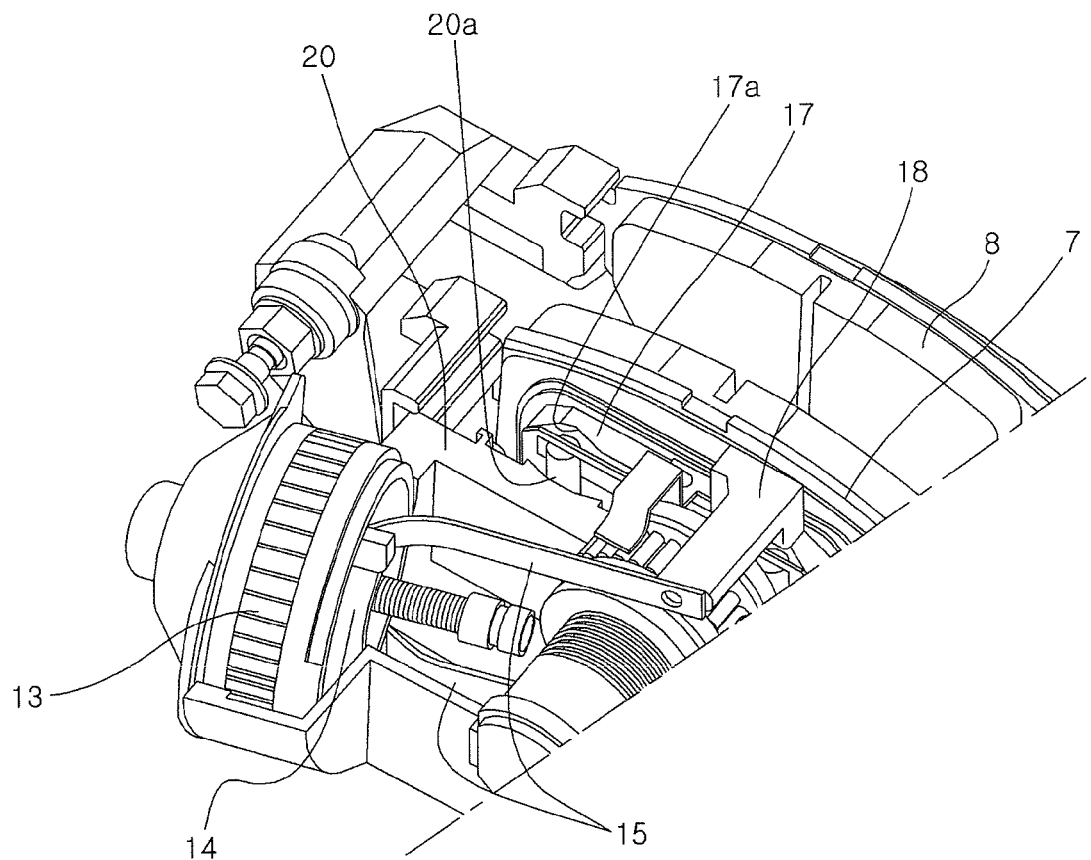
(a)
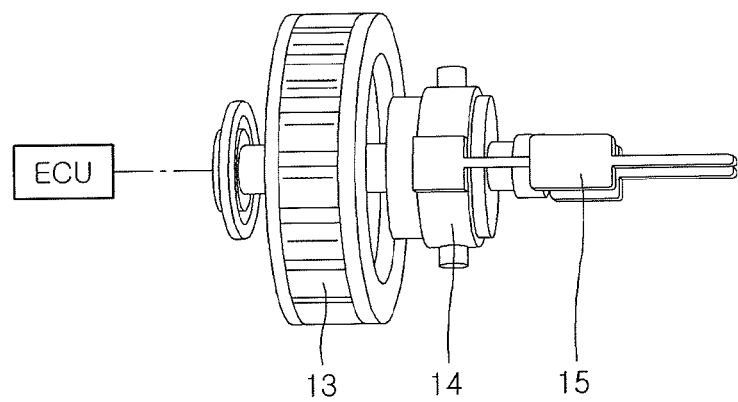
(b)

FIG.3
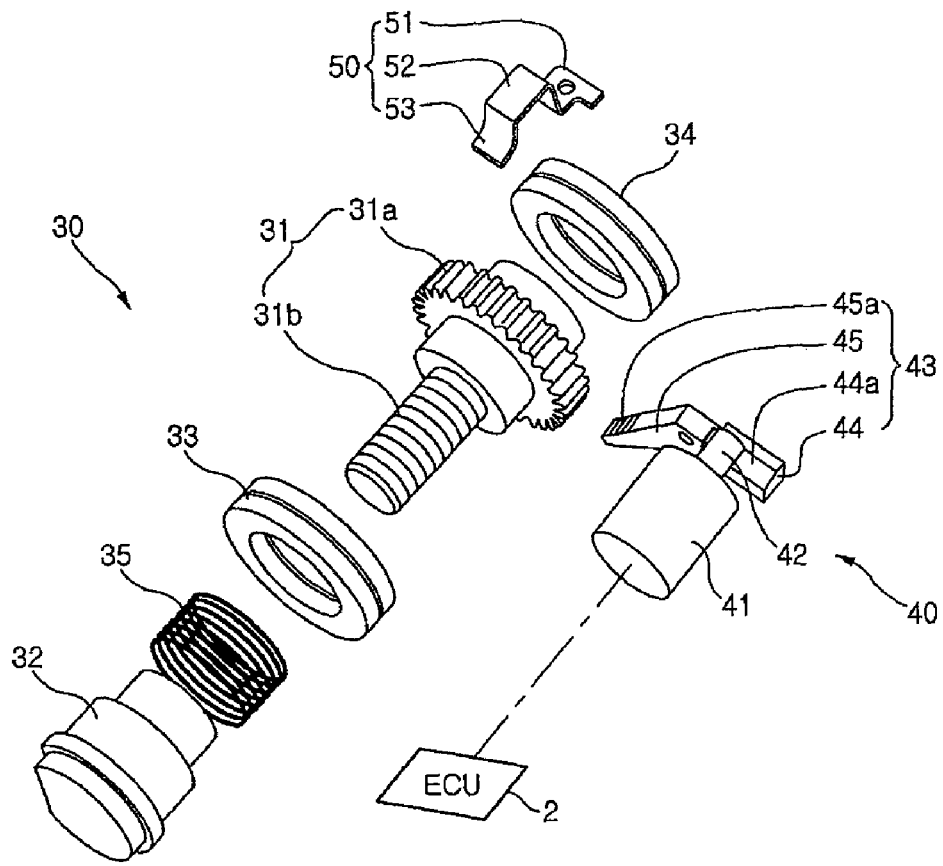
(a)
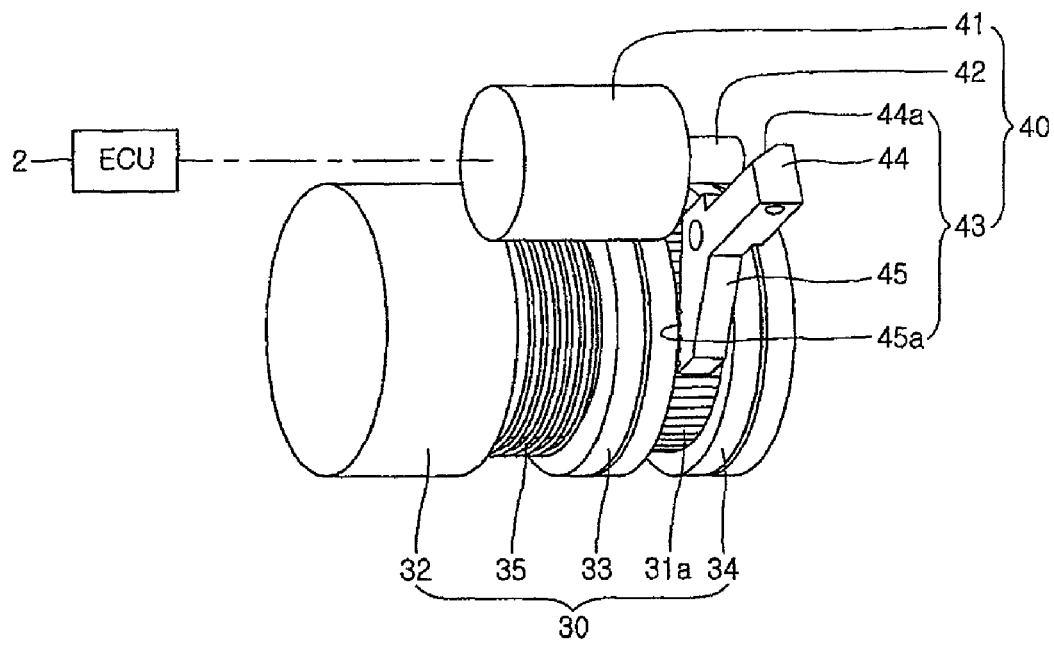
(b)

FIG.4
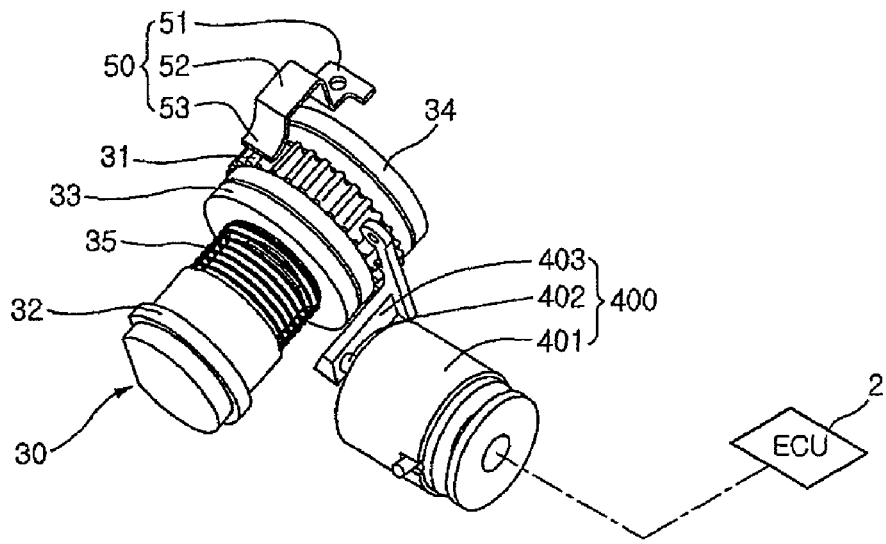
(a)
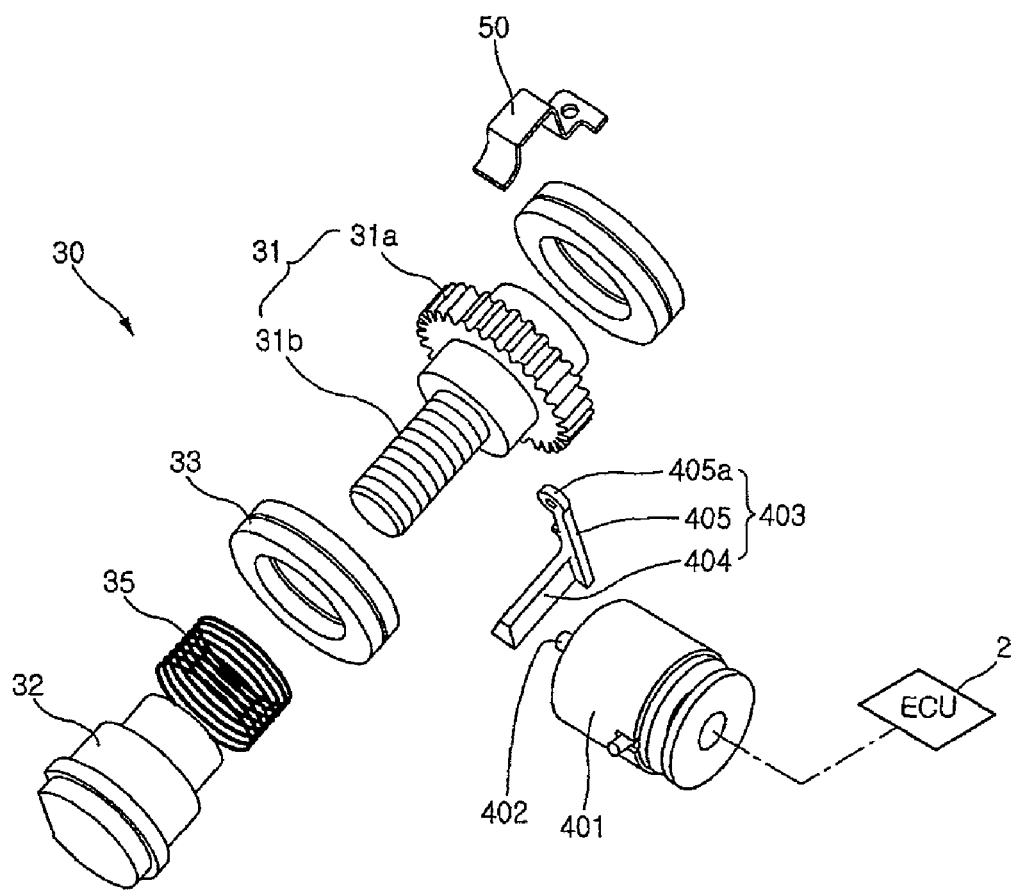
(b)

FIG.8
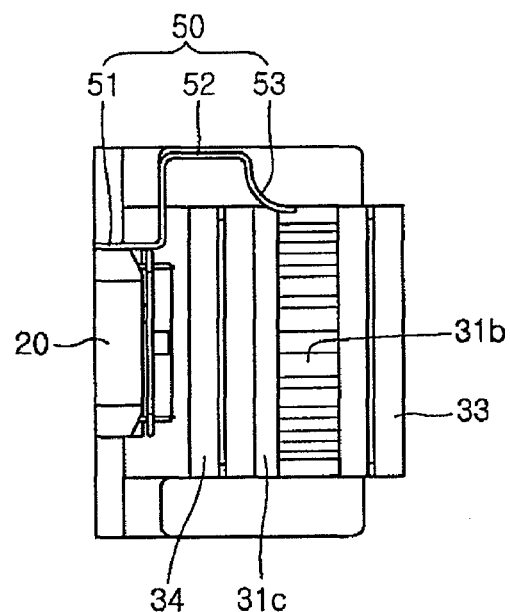
(a)
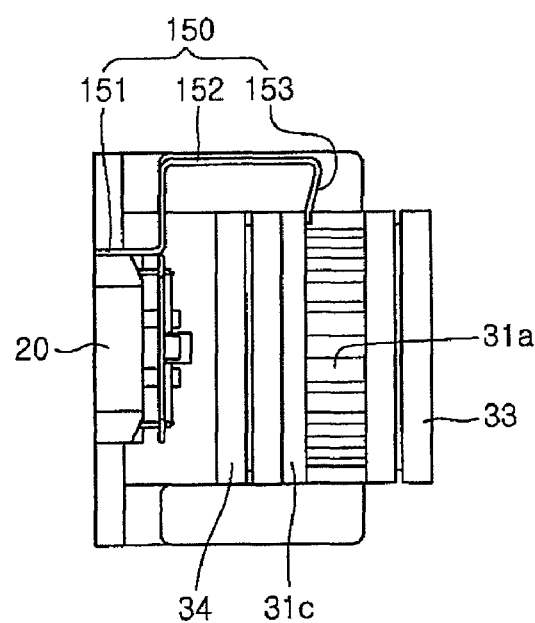
(b)

FIG.10
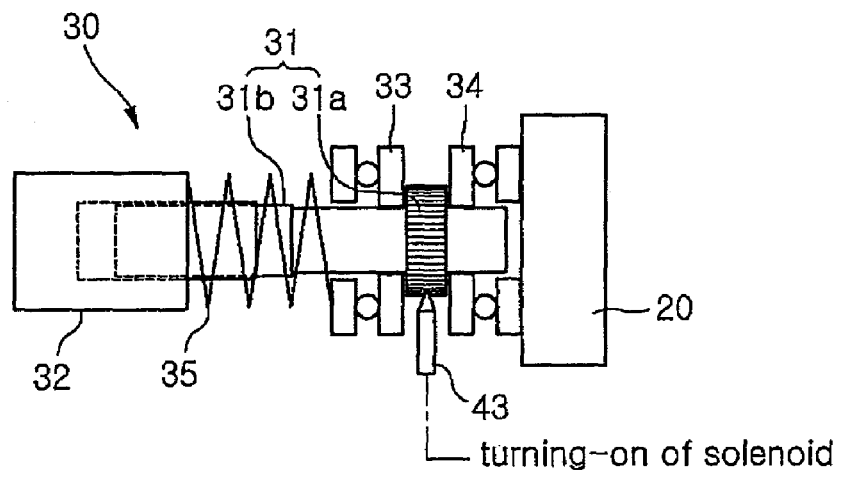
<main braking>
(a)
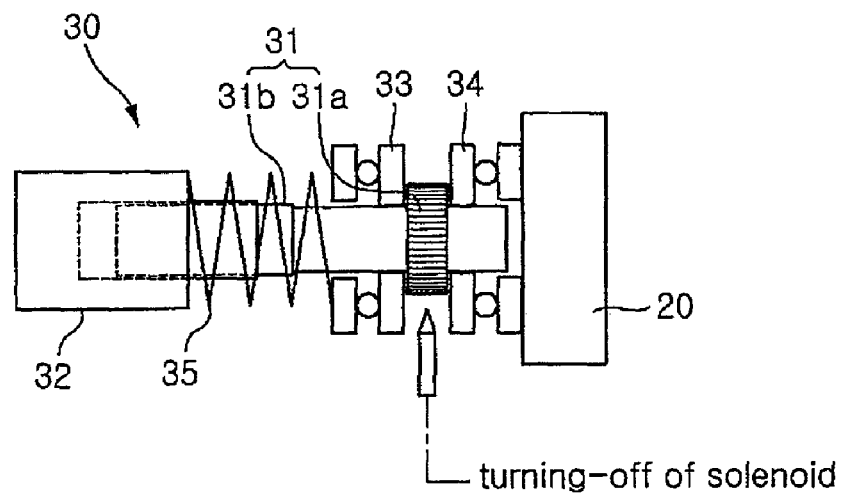
<Fail-Safe>
(b)

FIG.11
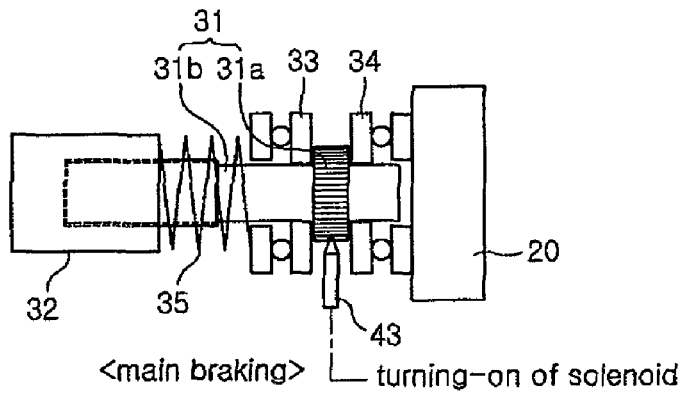
<main braking> — turning-on of solenoid
(a)
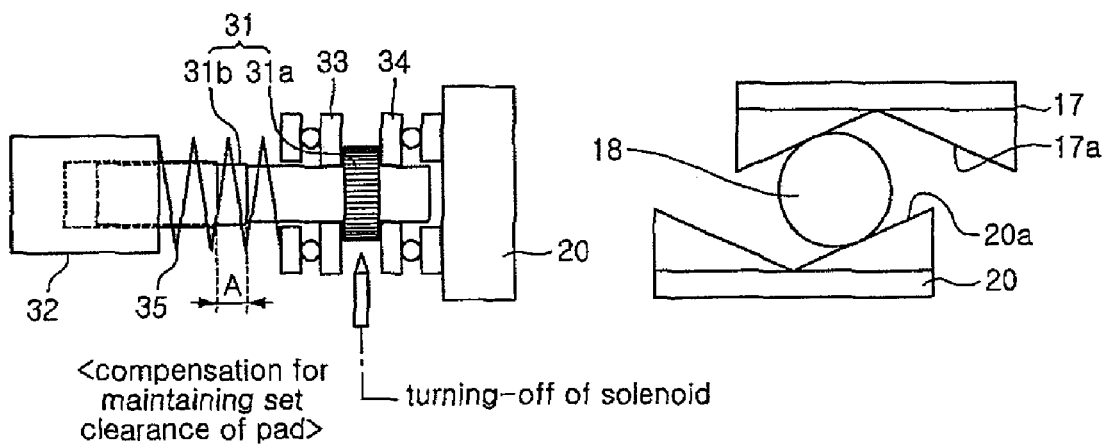
<compensation for maintaining set clearance of pad> — turning-off of solenoid
(b)
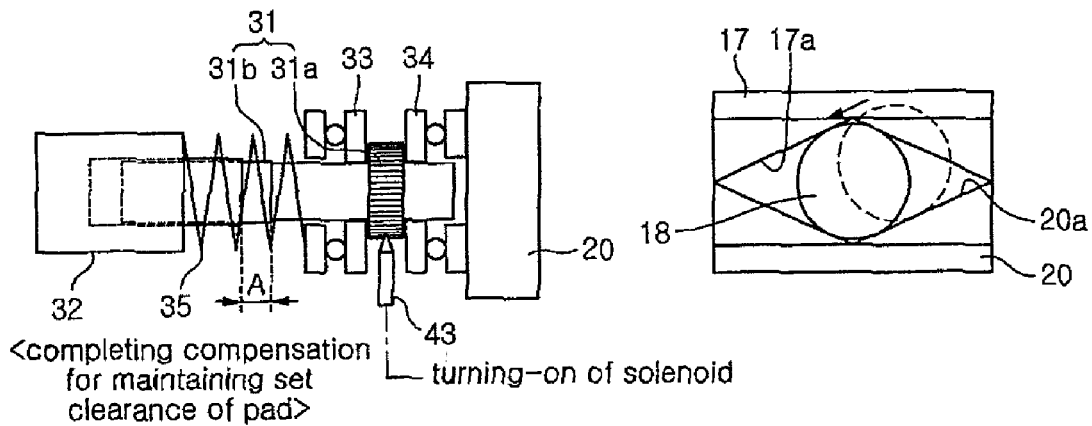
<completing compensation for maintaining set clearance of pad> — turning-on of solenoid
(c)

FIG.13
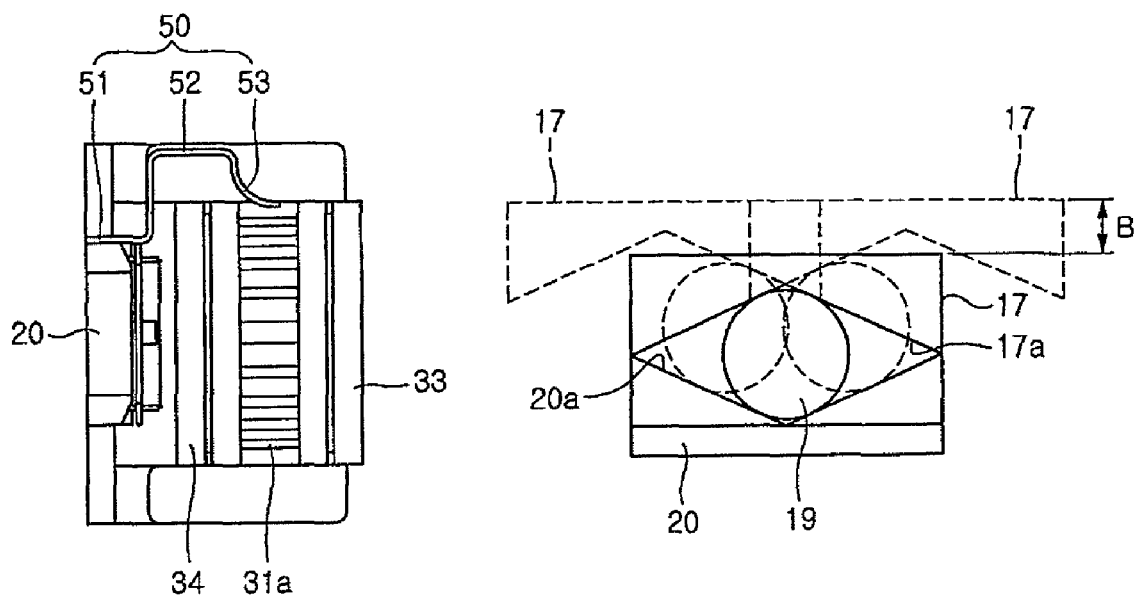
<main braking>
(a)
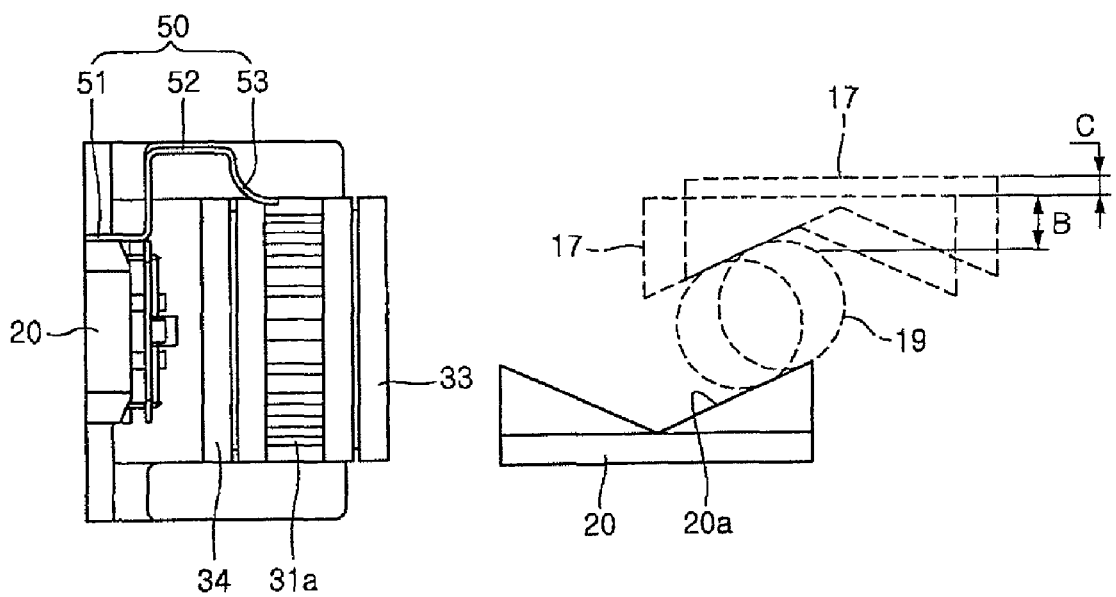
<parking braking>
(b)

SINGLE MOTOR ELECTRO WEDGE BRAKE SYSTEM USING SOLENOID MECHANISM FOR IMPLEMENTING ADDITIONAL FUNCTIONS

CROSS-REFERENCE TO RELATED APPLICATIONS

The present application is based on, and claims priority from, Korean Application Serial Number 10-2007-0062110, filed on Jun. 25, 2007, the disclosure of which is hereby incorporated by reference herein in its entirety.

FIELD OF THE INVENTION

The present invention relates to a wedge brake system, and more particularly, to a single motor electro wedge brake system, which uses a solenoid mechanism to implement additional functions.

BACKGROUND OF THE INVENTION

In general, a brake system is used to decelerate, stop, or park a moving vehicle.

A friction brake, which converts kinetic energy into thermal energy by using a frictional force and radiates the thermal energy to the air, is generally used in the brake system. Pads press both sides of a disk, which rotates together with a wheel, with hydraulic pressure, so that the friction brake implements a braking function.

The hydraulic brake implements braking by pressing the pads against the disk using hydraulic pressure. For this reason, the hydraulic brake cannot help having a complicated structure including a master cylinder that is operated by a booster for increasing a force applied to a pedal to generate hydraulic pressure, hydraulic pressure lines connected to a wheel cylinder, and various devices that control and assist the cylinders and lines. Accordingly, improvement in the stability of the hydraulic brake is limited due to the complicated structure and deterioration in the reliability of a braking performance, which is caused by use of hydraulic pressure.

Therefore, an electro wedge brake system has been being developed and applied so as to have a simple structure unlike the hydraulic brake, improve the reliability of a braking performance, implement a parking brake function, improve the responsiveness and performance of an ABS (Anti Brake System), and optimally control an integrated chassis.

The electro wedge brake (EWB) uses the following method when braking. That is, brake pads are pressed against the disk by a wedge assembly that is operated by an actuator, and frictionize the disk so as to implement a braking function.

In this case, even though the EWB uses a motor using a voltage of 12 V, the EWB generates the same braking force as the hydraulic brake. The reason for this is that the EWB implements self-energizing using a wedge phenomenon. That is, as the actuator is driven, the wedge is moved to press the pads and a frictional force between the pad and the disk serves as an additional input force. Even though the power of the motor is small, it is possible to generate a large braking force due to the wedge effect, which is caused by the wedge structure.

In addition, whenever an engine is started, the EWB has a function for compensating a clearance of the pad, that is, a function for moving the wedge assembly toward the pad to adjust a clearance between the pad and the disk, which deviates from a set value due to abrasion, so as to always maintain a set clearance of the pad.

Further, the EWB also has a Fail-Safe function, that is, a function for releasing a braking force applied to the disk to prevent an abnormal operation of a vehicle occurring when a braking force is not released and continuously applied during brake-fail.

In addition, the EWB can implement an EPB (Electric Parking Brake) function.

The EWB implements various additional functions such as a function for maintaining a set clearance of a pad, a Fail-Safe function, and an EPB function in addition to a main braking function. For this reason, the entire structure of the EWB becomes complicated. In particular, since the EWB uses a motor for implementing a braking function and another motor for implementing various additional functions, the EWB requires at least two motors.

Since the EWB uses two motors to separately generate power, the size of the EWB cannot help being increased due to a space for a motor. The increase in size causes limitation in assembling the EWB at the wheel.

SUMMARY OF THE INVENTION

Embodiments of the present invention help overcome the above-mentioned problems and provide an electro wedge brake that implements a main braking function by using power generated from one motor. Further, the electro wedge brake implements various additional functions, such as a function for maintaining a set clearance of a pad, a Fail-Safe function, and an EPB function, by using a solenoid mechanism interlocked with a main braking motor. Accordingly, since the electro wedge brake uses only one motor, the size of the entire electro wedge brake can be reduced to improve the assembly property of the electro wedge brake. In addition, it is possible to reduce the number of parts related to the motion conversion, which are required when a motor is used. Therefore, it is possible to reduce manufacturing cost and weight of the electro wedge brake.

Embodiments of the present invention provide an electro wedge brake that implements a function for maintaining a set clearance of a pad, a Fail-Safe function, and an EPB function by using not a motor but a solenoid mechanism. Accordingly, it is possible to further simplify the structure for converting motion between related parts as compared to when a motor is used. Therefore, it is possible to easily design the electro wedge brake.

A single motor electro wedge brake system, which uses a solenoid mechanism to implement additional functions, includes an electric pedal, an ECU, wedge calipers, wedge actuator assemblies, and housings. The electric pedal is operated by a driver to brake a vehicle. ECU generates control signals by using information measured in the vehicle during braking of the vehicle. Each of the wedge calipers includes inner and outer pad assemblies and a torque member. The inner and outer pad assemblies cover a disk rotating together with a wheel and are provided on both sides of the disk to press the disk. The torque member performs an interlocking operation so that the outer pad assembly provided on the opposite side to the inner pad assembly is also moved toward the disk when the inner pad assembly is moved toward the disk. The wedge actuator assemblies convert torque, which is generated by one motor driven in normal and reverse directions by ECU, into an axial motion to move the inner pad assembly toward the disk. Further, the wedge actuator assemblies form a braking force by using a force applied to the disk that is generated using self-energizing depending on a wedge phenomenon caused by the movement of a wedge roller having a diameter. Furthermore, the wedge actuator assemblies implement a function for maintaining a set clearance of a pad, a Fail-Safe function, and an electric parking brake (EPB) function, by using that the forward movement of a push rod shaft screwed using a NSL (Non-Self Locking) type screw is restrained or released on the basis of ON/OFF control of the solenoid mechanism interlocked with the motor controlled by ECU. Each of the housings receives the wedge actuator assembly and is each fixed to the side of the wedge caliper.

Further, an auxiliary power supply circuit may be formed of an auxiliary battery in ECU, the motor of the wedge actuator assembly, and a solenoid.

Each of the wedge actuator assemblies may include a braking motor unit, a wedge braking unit, and a solenoid mechanism. The braking motor unit generates a braking force with power generated by the motor controlled by ECU. The wedge braking unit converts the torque of the motor into an axial motion to push the inner pad assembly against the disk. Further, the wedge braking unit converts the self-energizing, which is caused by the change in position of the wedge roller depending on the operation of the inner pad assembly from the disk, into an input force pressing the inner pad assembly against the disk. The solenoid mechanism is interlocked with the motor in order to implement a function for maintaining set clearances of the inner and outer pad assemblies, a Fail-Safe function against motor troubles, and an EPB function.

The braking motor unit may include a motor, a linear motion converter, and an interlocking rod. The motor is fixed to one side of the housing by a fixed bracket fixed to the housing and is controlled by ECU. The linear motion converter is fixed to an output shaft of the motor and moves forward and backward in an axial direction depending on the drive of the motor. The interlocking rod is fixed to the linear motion converter and moves depending on the axial movement of the linear motion converter.

The wedge braking unit may include a connecting rod, a wedge moving plate, a wedge base plate, and a wedge roller. The connecting rod is fixed to the motor so that an axial moving force caused by the drive of the motor is applied to the connecting rod. The wedge moving plate is moved by an integrally formed connecting rod so as to press the inner pad assembly, which is positioned on the opposite side to the outer pad assembly, that is, on the side of the disk, against the disk. The wedge base plate is arranged parallel to the wedge moving plate so as to face the wedge moving plate. The wedge roller is provided between rolling contact surfaces formed between the pair of plates and generates a frictional force during the movement of the wedge moving plate.

The solenoid mechanism may include an adjusting unit, a solenoid unit, and an EPB spring. The adjusting unit includes a push rod shaft fixed using a NSL (Non-Self Locking) type screw and is moved toward the disk in an axial direction when a function for maintaining a set clearance of a pad, a Fail-Safe function, and an electric parking brake function are implemented. The solenoid unit is turned on or off to operate the adjusting unit and releases or applies a restraining force. The EPB spring is fixed to the wedge moving plate moved by the motor so that the push rod shaft is restrained to maintain a parking braking performance during the operation of the electric parking brake.

When torque of the motor driven by ECU at the start of the engine is converted into a linear motion and the wedge moving plate generating a wedge effect by the wedge roller is moved, ECU turns off the solenoid of the solenoid unit so that the restraint of the adjusting unit, which maintains the contact between the pad and the disk, on the push rod shaft is released. Then, ECU drives the motor again to move the wedge moving plate so that the set clearance is secured between the pad and the disk, and turns on the solenoid so as to restrain the push rod shaft. After that, ECU drives the motor in a reverse direction to allow the wedge moving plate to return to an initial state, thereby implementing the function for maintaining the set clearance of the pad by using the solenoid mechanism.

The adjusting unit may include a supporting nut, a push rod shaft, a latch, front and rear bearings, and a spring. The supporting nut includes locking portions (grooves) formed on the outer periphery thereof and is fitted to position restraining portions of the housing. The push rod shaft includes a push rod screw formed on the outer periphery thereof so as to be screwed to the supporting nut in non-self locking type. The latch is formed on the outer periphery of a portion of the push rod shaft without the push rod screw. The front and rear bearings are disposed on the push rod shaft at the front and rear sides of the latch. One end of the spring is fixed to the supporting nut and the other end of the spring continuously applies an axial force to the front bearing.

The solenoid unit may include a solenoid and a switching lever. The solenoid is received at one side in the housing and turned on or off by ECU. The switching lever acts like a seesaw about a hinge shaft by a movable shaft protruding or retreating during the operation of the solenoid. The switching lever may include a press part, a latch contact part, and a contact portion. The press part is positioned so as to correspond to the moving path of the movable shaft of the solenoid. The latch contact part is bent from the end of the press part hinge-attached to the housing and rotates about a hinge point. The contact portion is formed on the outer surface of the latch contact part so as to be engaged with the latch formed on the push rod shaft.

In this case, the switching lever may include a contact slope inclined along the longitudinal direction of the press part so as to generate a force applied downward about the hinge point when a force is applied to the press part by the movable shaft of the solenoid.

The EPB spring may include a fixation portion, a connection portion, a connection portion, and a press portion. The fixation portion is fixed to the wedge moving plate. The connection portion is bent and extends so as to protrude from the fixation portion. The press portion is bent downward from an end of the connection portion and generates a force so as to restrain the axial movement of the push rod shaft when the solenoid is turned off.

The press portion of the EPB spring may press or push the rear bearing provided on the side of the latch of the push rod shaft so as to generate a restraining force. Alternatively, the press portion of the EPB spring may press or push an EPB spring positioning flange formed at the rear side of the latch of the push rod shaft.

BRIEF DESCRIPTION OF THE DRAWINGS

For a better understanding of the nature and objects of the present invention, reference should be made to the following detailed description with the accompanying drawings, in which:

FIGS. 2A and 2B are detailed views of a motor, which moves in an axial direction in FIG. 1;

FIGS. 3A and 3B are views of an adjusting unit, which performs an adjustment corresponding to the abrasion of a pad used in the embodiment of the present invention;

FIGS. 4A and 4B are views showing the modification of a solenoid unit that restrains the adjusting unit of the present invention;

FIGS. 8A and 8B are views showing the modification of a push rod shaft of the adjusting unit for the operation of the EPB spring used in the embodiment of the present invention;

FIGS. 10A and 10B are views illustrating Fail-Safe of the single motor electro wedge brake system according to the embodiment of the present invention;

FIGS. 11A, 11B, and 11C are views illustrating an operation for maintaining a set clearance of a pad of the single motor electro wedge brake system according to the embodiment of the present invention;

FIGS. 13A and 13B are views illustrating the operation of a bearing forming the EPB spring and the adjusting unit during the operation of the electric parking brake used in the embodiment of the present invention.

DETAILED DESCRIPTION OF THE PREFERRED EMBODIMENTS

A preferred embodiment of the present invention will be described in detail below with reference to the accompanying drawings.

Figure 1:
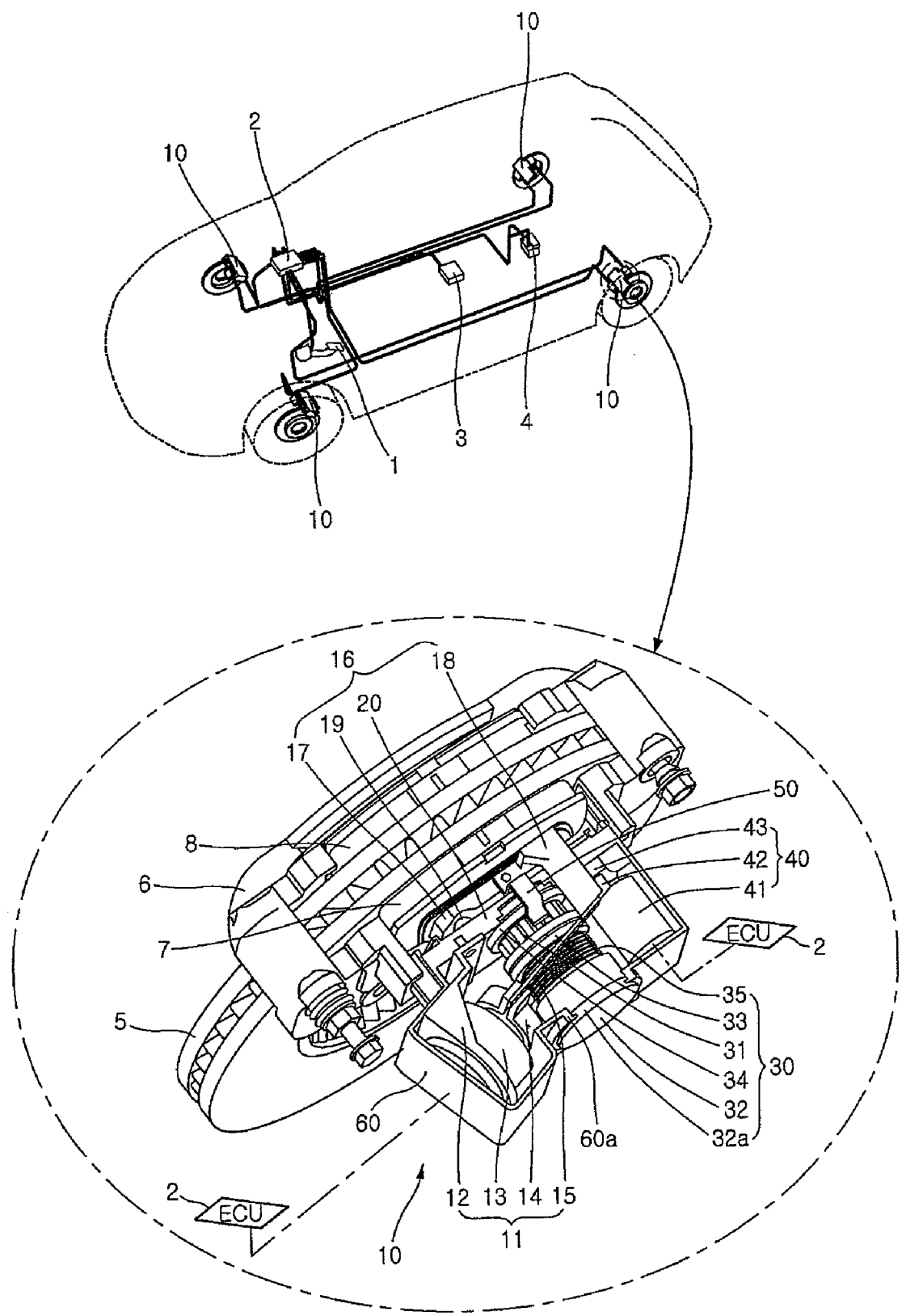
FIG. 1 is a view of a single motor electro wedge brake system, which uses a solenoid mechanism to implement additional functions, according to an embodiment of the present invention.

FIG. 1 is a view of a single motor electro wedge brake system, which uses a solenoid mechanism to implement additional functions, according to an embodiment of the present invention. The single motor electro wedge brake system according to an embodiment of the present invention includes an electric pedal 1, an ECU 2, wedge calipers 6, and wedge actuator assemblies 10. Electric pedal 1 is operated by a driver to brake a vehicle. ECU 2 performs control in consideration of information about the vehicle when the vehicle is braked. Each of wedge calipers 6 presses a disk 5, which rotates together with a wheel, to brake the vehicle. Each of wedge actuator assemblies 10 perform braking by pressing a pad against disk 5 using power, which is generated by one motor 13 controlled by ECU 2, during the braking. Further, each of wedge calipers 6 includes a solenoid mechanism, which implements a function for maintaining a set clearance of a pad, a Fail-Safe function, and an EPB (Electric Parking Brake) function.

The single motor electro wedge brake system further includes an auxiliary battery 4. The auxiliary battery 4 is used as a spare battery for ECU 2 and motors 13 and solenoids 41 of actuator assemblies 10.

Further, when a parking brake is operated, the single motor electro wedge brake system receives signals so that ECU 2 perceives a parking brake conversion state. For example, a parking brake button, which generates separate electric signals corresponding to portions of a driver's seat and supplies the signals to ECU 2, is used.

The single motor electro wedge brake system further includes housings 60 in which wedge actuator assemblies 10 are received, respectively. Each of housings 60 is fixed to wedge caliper 6.

In this case, wedge caliper 6 and housing 60 may be fixed to each other in various ways. For example, housing 60 may have a guide that protrudes and is inserted into wedge caliper 6. Accordingly, the housing is fixed to the wedge caliper.

ECU 2 performs a control required for braking on the basis of information about a pushing distance of electric pedal 1 to be operated and information about an attitude of a vehicle obtained from a yaw moment sensor 3 provided in the vehicle.

In addition, various sensors are provided to wedge caliper 6 and wedge actuator assembly 10 fixed to the wedge caliper, so that measurement signals are transmitted to ECU 2. For example, pad abrasion sensing sensors, which sense an increase of a clearance between disks 5 depending on the increase of a set clearance of the pad so as to always maintain a set clearance, and load sensors, which are used to prevent wheel jamming occurring when a pad is pressed against disk 5 by a wedge roller during the braking, may be provided to the wedge caliper and the wedge actuator assembly.

Further, wedge caliper 6 includes inner and outer pad assemblies 7 and 8 that cover disk 5 rotating together with the wheel, are provided on both sides of disk 5 to press disk 5.

Wedge caliper 6 includes a torque member for performing an interlocking operation (the operation of a general caliper type brake) so that outer pad assembly 8 provided on the opposite side to the inner pad assembly is also moved toward disk 5 when inner pad assembly 7 is pressed against disk 5.

Further, each of wedge actuator assemblies 10 includes a braking motor unit 11, a wedge braking unit 16, and a solenoid mechanism. Braking motor unit 11 generates a braking force with power, which is generated by one motor 13 controlled by ECU 2. Wedge braking unit 16 is interlocked with braking motor unit 11 so as to press pad assemblies 7 and 8 against disk 5 at one side of wedge caliper 6. The solenoid mechanism implements a function for maintaining set clearances of pad assemblies 7 and 8, a Fail-Safe function against motor troubles, and an EPB (Electric Parking Brake) function.

Furthermore, braking motor unit 11 generates power, which is used to implement the brake function, by the control of ECU 2 during the braking. Braking motor unit 11 operates wedge braking unit 16, which presses inner pad assembly 7 provided on one side of disk 5, by using one motor 13 provided on one side of housing 60, which is fixed to the side of wedge caliper 6, as a power source.

For this purpose, as shown in FIG. 2, braking motor unit 11 includes motor 13, a linear motion converter 14, and an interlocking rod 15. Motor 13 is fixed to one side of housing 60 fixed to the side of wedge caliper 6 by a fixed bracket 12 that is fixed to housing 60, and is controlled by ECU 2. Linear motion converter 14 is fixed to an output shaft of motor 13, and moves forward and backward in an axial direction depending on the drive of the motor. Interlocking rod 15 is fixed to linear motion converter 14, and moves depending on the axial movement of linear motion converter 14.

In this case, when a rotating shaft of linear motion converter 14 is rotated by the drive of motor 13, the linear motion converter moves forward and backward according to the rotational direction of the rotating shaft due to the fact that the linear motion converter is engaged with threads formed on the outer periphery of the rotating shaft. This structure is generally applied to an EWB (electro wedge brake) of a vehicle.

For example, although an interlocking rod 15 of a linear motion converter 14 shown in FIG. 2B has a slight difference in shape, the interlocking rod moves forward and backward in an axial direction of a motor 13 by the drive of the motor. Further, a method of generating a shaft pulling force in an electric parking brake (EPB) is a method using still another structure.

Further, interlocking rod 15 diagonally crosses housing 60 and is positioned on the side opposite to motor 13. Interlocking rod 15 moves together with linear motion converter 14, which moves in the axial direction depending on the drive of motor 13. Further, interlocking rod 15 is composed of a pair of upper and lower pieces so that a moving force caused by linear motion converter 14 becomes uniform.

The reason for the diagonal arrangement of interlocking rod 15 is to utilize a space in housing 60, and housing 60 is made more compact by reducing the space in housing 60, which is occupied by interlocking rod 15.

Further, wedge braking unit 16 includes a connecting rod 18, a wedge moving plate 17, a wedge base plate 20, and a wedge roller 19. Connecting rod 18 is fixed to motor 13 so that an axial moving force caused by the drive of motor 13 is applied to the connecting rod. Wedge moving plate 17 is moved by an integrally formed connecting rod 18 so as to press inner pad assembly 7, which is positioned on the opposite side to outer pad assembly 8, that is, on the side of disk 5, against disk 5. Wedge base plate 20 is arranged parallel to wedge moving plate 17 so as to face wedge moving plate 17. Wedge roller 19 is provided between rolling contact surfaces 17a and 20a, which are formed between the pair of plates 17 and 20, and generates a frictional force.

Connecting rod 18 is fixed to an end of interlocking rod 15, which moves in an axial direction by linear motion converter 14 moved depending on the drive of motor 13, and moves the wedge plate 17 in a direction where interlocking rod 15 is moved.

Further, connecting rod 18 extends perpendicular to the surface of the wedge moving plate at upper and lower portions of wedge moving plate 17, and is fixed to the end of interlocking rod 15 by bolts or the like.

Wedge roller 19 is provided between the pair of plates 17 and 20 facing each other, and has a cylindrical shape. The wedge roller causes a wedge phenomenon where self-energizing is performed by a frictional force generated depending on the operation of plates 17 and 20, and then applies an input force to press the pad.

For this purpose, wedge roller 19 is positioned between rolling contact surfaces 17a and 20a including a plurality of grooves, which has V-shaped cross sections and is formed on the surfaces of the pair of plates 17 and 20 facing each other. Rolling contact surfaces 17a and 20a including the plurality of grooves, which has V-shaped cross sections, and wedge roller 19 generate a frictional force. Further, rolling contact surfaces 17a and 20a make one plate (wedge plate 17) move toward the pad depending on the change in position of wedge roller 19.

Wedge base plate 20 is stationary with respect to wedge moving plate 17, which is moved by power of motor 13. For this purpose, wedge base plate 20 is formed using a part of housing 60 fixed to the side of wedge caliper 6.

The solenoid mechanism, which implements various additional functions in addition to a main braking function implemented using braking motor unit 11 and wedge braking unit 16 during the operation of the EWB, includes an adjusting unit 30, a solenoid unit 40, and an EPB spring 50. Adjusting unit 30 is fixed using a NSL (Non-Self Locking) type screw, and is moved toward disk 5 in an axial direction when a pad compensating function, a Fail-Safe function, and an electric parking brake function are implemented. Solenoid unit 40 is turned on or off to operate adjusting unit 30, and releases or applies a restraining force. EPB spring 50 restrains adjusting unit 30 to maintain a parking braking performance during the operation of the electric parking brake.

In this case, as shown in FIG. 3A, adjusting unit 30 includes a supporting nut 32, a push rod shaft 31, a pair of front and rear bearings 33 and 34, and a spring 35. Supporting nut 32 has locking portions 32a (grooves) formed on the outer periphery thereof and is fitted to position restraining portions 60a of housing 60. Push rod shaft 31 has a push rod screw 31b formed on the outer periphery thereof so as to be screwed to supporting nut 32, and is moved in an axial direction by the rotation thereof. Front and rear bearings 33 and 34 are disposed on the push rod shaft at the front and rear sides of a latch 31a, which is formed on the outer periphery of a portion of push rod shaft 31 without push rod screw 31b. One end of spring 35 is fixed to supporting nut 32, and the other end of the spring continuously applies an axial force to front bearing 33.

Further, push rod shaft 31 and supporting nut 32 use a NSL (Non-Self Locking) type screw, that is, a screw having a large lead angle. Accordingly, when a force is applied to the push rod shaft in an axial direction, the push rod shaft is automatically rotated due to the large lead angle and is moved in the axial direction.

A needle bearing, which withstands an axial force and does not restrain rotation, is used as front bearing 33. A thrust bearing is used as rear bearing 34.

During the initial assembling, spring 35 is provided between supporting nut 32 and front bearing 33 so as to continuously apply a force to front bearing 33.

Further, adjusting unit 30 is disposed at the central portion of base plate 20 of wedge braking unit 16 so that a force applied by push rod shaft 31 is applied to wedge base plate 20.

Solenoid unit 40 includes a solenoid 41 that is received at one side in housing 60 and turned on or off by ECU 2, and a switching lever 43 that operates like a seesaw about a hinge shaft by a movable shaft 42 protruding or retreating during the operation of solenoid 41.

Switching lever 43 includes a press part 44 that is positioned so as to correspond to the moving path of movable shaft 42 of solenoid 41, and a latch contact part 45 that is bent from the end of press part 44 hinge-attached to housing 60 and rotates about a hinge point.

In this case, switching lever 43 is generally supported by a spring so as to return to an initial position when the pressing of solenoid 41 is released.

Press part 44 has a contact slope 44a inclined along the longitudinal direction of press part 44 so as to generate a force applied downward about the hinge point when a force is applied to the press part by movable shaft 42 of solenoid 41.

In addition, a contact portion 45a is formed on the outer surface of the latch contact part 45 so as to be engaged with latch 31a formed on push rod shaft 31 of adjusting unit 30.

Accordingly, as shown in FIG. 3B, in adjusting unit 30 and solenoid unit 40, solenoid 41 is disposed in the axial direction of push rod shaft 31 of adjusting unit 30. Further, switching lever 43, which operates like a seesaw about the hinge shaft, is assembled so as to be engaged with latch 31a of push rod shaft 31. As a result, as long as solenoid 41 is not turned off, the axial movement of push rod shaft 31 is restrained.

If solenoid 41 is disposed parallel to the axial direction of the push rod shaft 31 of adjusting unit 30, it is possible to improve the space utilization of the entire housing 60 including solenoid 41.

Further, the solenoid unit, which restrains and releases the push rod shaft of the adjusting unit, may be modified in various ways. For example, as shown in FIG. 4A, a solenoid

401 of a solenoid unit 460 may be positioned perpendicular to push rod shaft 31 of adjusting unit 30.

Since solenoid 401 protrudes, the position of solenoid 401 deteriorates the space utilization of the entire housing 60 including solenoid 401. However, load required in solenoid 401 becomes smaller than when the solenoid is disposed parallel to the axial direction of the push rod shaft.

As shown in FIG. 4B, solenoid unit 400 includes solenoid 401 that is received at one side in housing 60 and turned on or off by ECU 2, and a switching lever 403 that angularly moves about a hinge shaft by a movable shaft 402 protruding or retreating during the operation of solenoid 401.

Switching lever 403 includes a press part 404 that is positioned so as to correspond to the moving path of movable shaft 402 of solenoid 401, and a latch contact part 405 that is perpendicularly formed at the end of press part 404 and hinge-attached to housing 60 at the end thereof.

In this case, a contact portion 405a protrudes from latch contact part 405 so as to be engaged with latch 31a formed on push rod shaft 31 of adjusting unit 30.

In addition, switching lever 403 is generally supported by a spring so as to return to an initial position when the pressing of solenoid 401 is released.

Figure 5:
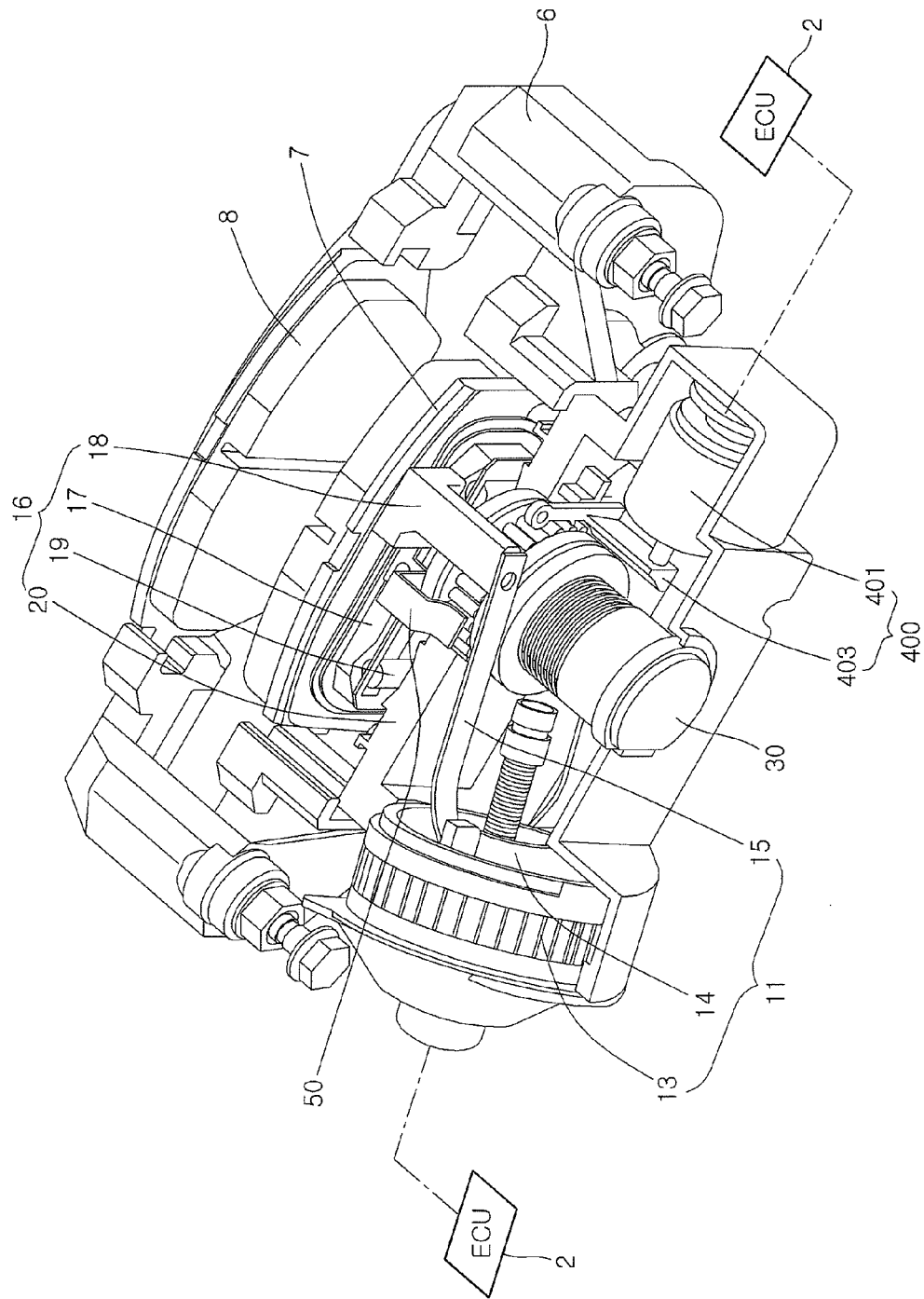
FIG. 5 is a view showing a single motor electro wedge brake system using the modified solenoid unit shown in FIG. 4.

The above-mentioned modification of solenoid unit 400 causes the entire shape of housing 60 to be changed. That is, as shown in FIG. 5, a braking motor unit 11, which generates a braking force with power generated from one motor 13 controlled by ECU 2, is positioned at one side in housing 60 forming an entire appearance. Further, adjusting unit 30 is positioned in front of wedge braking unit 16 at a central portion of housing 60, and solenoid unit 400 is positioned at the other side in housing 60 so that housing 60 partially protrude.

Meanwhile, one end of EPB spring 50, which is used to implement an electric parking brake function, is fixed to wedge braking unit 16. The other end of the EPB spring is positioned at latch 31a of push rod shaft 31 of adjusting unit 30. Accordingly, when solenoid 41 is turned off during the operation of the parking brake, one end of EPB spring 50 restrains push rod shaft 31. As a result, when solenoid 41 is turned off, the EPB spring restrains adjusting unit 30.

Figure 6:
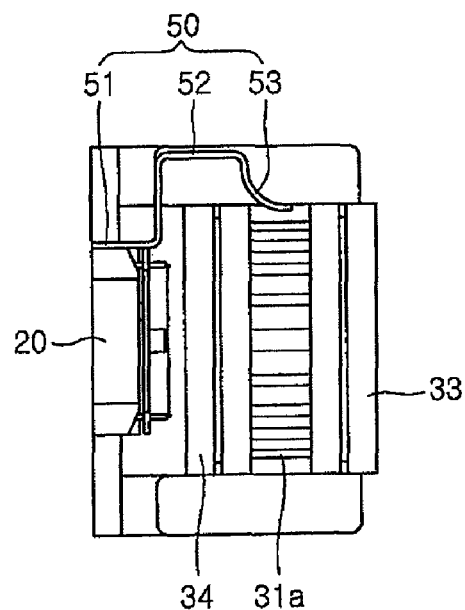
FIG. 6 is a view showing that an EPB spring for the operation of an electric parking brake used in the embodiment of the present invention is fixed.

For this purpose, as shown in FIG. 6, EPB spring 50 includes a fixation portion 51 that is screwed to wedge moving plate 17 of wedge braking unit 16, a connection portion 52 that is bent and extends so as to protrude from fixation portion 51, and a press portion 53 that is bent downward from the end of connection portion 52 and restrains the axial movement of push rod shaft 31 when solenoid 41 is turned off.

As an example of the restraint of push rod shaft 31 using EPB spring 50, press portion 53 of EPB spring 50 restrains rear bearing 34 positioned at the side surface of latch 31a of push rod shaft 31. That is, press portion 53 is positioned at rear bearing 34 and applies a strong force to rear bearing 34, so that the movement of push rod shaft 31 is restrained.

In this case, EPB spring 50 is moved together with wedge moving plate 17, which is moved by motor 13 so as to generate a final braking force, during the parking braking. Accordingly, press portion 53 of EPB spring 50 is positioned at rear bearing 34, and presses rear bearing 34 due to its own strong electric force so as to restrain the movement of push rod shaft 31.

Further, in order to improve the restraining force of push rod shaft 31, EPB spring 50 may be composed of a pair of pieces restraining push rod shaft 31 at upper and lower portions of the push rod shaft.

Figure 7:
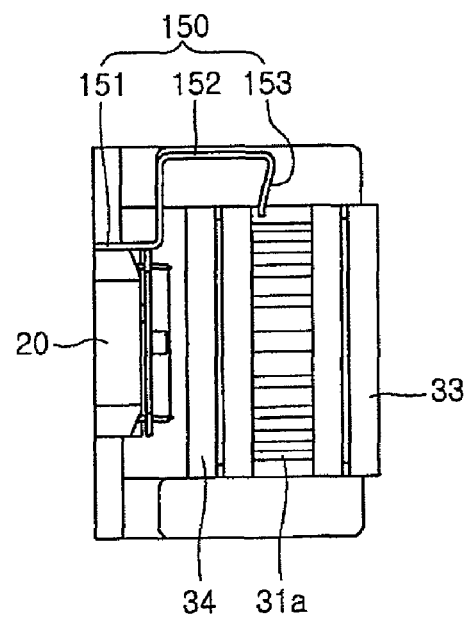
FIG. 7 is a view showing the modification of the EPB spring shown in FIG. 6.

Meanwhile, EPB spring 50 may be modified in various ways to perform a similar operation. For example, as shown in FIG. 7, a connection portion 152 extends to wedge braking unit 16 so as to protrude from a fixation portion 151 of an EPB spring 150. Further, a press portion 153, which is bent downward from the end of connection portion 152, is positioned at latch 31a of push rod shaft 31.

Accordingly, when solenoid 41 is turned off during the operation of the EPB, press portion 153 of EPB spring 150 is engaged with latch 31a of push rod shaft 31 so as to restrain the axial movement of push rod shaft 31.

The restraint of the axial movement of push rod shaft 31, which is performed using the EPB spring, may be performed by the modification of push rod shaft 31. That is, as shown in FIGS. 8A and 8B, an EPB spring positioning flange 31c is formed to have a large diameter at the rear side of latch 31a of push rod shaft 31, and press portion 53 or 153 of EPB spring 50 or 150 is positioned at EPB spring positioning flange 31c.

Accordingly, during the operation of the EPB, press portion 53 or 153 of EPB spring 50 or 150 restrains EPB spring positioning flange 31c of push rod shaft 31. As a result, when solenoid 41 is turned off, the axial movement of push rod shaft 31 is restrained.

The operation of the single motor electro wedge brake system according to the embodiment of the present invention will be described in detail below with reference to the accompanying drawings.

The electro wedge brake (EWB) system according to the embodiment of the present invention implements a main braking function by using power generated from one motor 13. Further, the electro wedge brake system implements various additional functions such as a function for maintaining a set clearance of a pad, a Fail-Safe function, and an EPB function, by using that the forward movement of push rod shaft 31 screwed using a NSL (Non-Self Locking) type screw is restrained or released on the basis of ON/OFF control of the solenoid mechanism interlocked with the main braking function motor 13. Accordingly, since only one motor 13 is used to generate power, it is possible to reduce the number of parts and to simplify the structure.

In addition, the electro wedge brake according to the embodiment of the present invention implements a function for maintaining a set clearance of a pad, a Fail-Safe function, and an EPB function by using a solenoid mechanism. For this reason, it is possible to reduce the number of parts related to power conversion and operation, which are required when a motor is used. Therefore, it is possible to easily design the electro wedge brake.

Since the electro wedge brake system uses one motor 13 and implements a function for maintaining a set clearance of a pad, a Fail-Safe function, and an EPB function except for the main braking by using a solenoid mechanism, it is possible to obtain these various characteristics of the present invention.

Accordingly, in the EWB according to the embodiment of the present invention, as shown in FIG. 1, a wedge caliper 6 including inner and outer pad assemblies 7 and 8 is provided at disk 5 that is rotated together with a wheel. Further, a wedge actuator assembly 10, which is controlled by ECU 2 receiving operational information of electric pedal 1, is provided in housing 60, and is fixed to the side of wedge caliper 6.

That is, wedge actuator assembly 10 includes one motor 13 controlled by ECU 2, and wedge braking unit 16. Wedge braking unit 16 has a wedge structure that generates an input force pressing the pad due to self-energizing while moving the pad as the torque of the motor is converted into an axial moving force by linear motion converter 14. In this case, the self-energizing is caused by the change in position of the wedge roller depending on the operation of wedge roller 19 with respect to the pad.

In addition, wedge actuator assembly 10 includes adjusting unit 30 positioned at the central portion of wedge braking unit 16. Adjusting unit 30 performs an adjustment function for maintaining a clearance between disk 5 and the pad when the pad is abraded. Further, adjusting unit 30 includes a NSL (Non-Self Locking) type screw interlocked with solenoid 41 so as to implement the Fail-Safe function for releasing the pressing of wedge braking unit 16 when motor 13 is broken down in a braking state.

Further, adjusting unit 30 includes EPB spring 50, which restrains the movement with respect to adjusting unit 30 while solenoid 41 is turned off, so as to perform the EPB function of the electric brake during the braking.

The operation, which is performed by the EWB according to the embodiment of the present invention using one motor 13, will be classified into the main braking function and the various additional functions, such as a function for maintaining a set clearance of a pad, a Fail-Safe function, and an EPB function, and will be described in detail below.

In the main braking function of the present invention, when ECU 2 generates control signals by analyzing information about a pushing distance of electric pedal 1 and information about a moving vehicle obtained from various sensors, motor 13 controlled by ECU 2 is driven and linear motion converter 14 generates an axial moving force in the axial direction, that is, in a direction where the linear motion converter protrudes from motor 13 (braking against forward movement) or retreats toward motor 13 (braking against backward movement) depending on the rotational direction of motor 13.

Subsequently, the axial moving force of linear motion converter 14 caused by motor 13 moves interlocking rod 15 fixed to linear motion converter 14, and the movement of interlocking rod 15 causes wedge braking unit 16 fixed to the end thereof to be continuously and linearly moved together with the pad. As wedge braking unit 16 is moved, a force for pressing the pad against disk 5 is generated due to the wedge structure using wedge roller 19.

That is, wedge moving plate 17 connected to connecting rod 18 and inner pad assembly 7 fixed to the side of the disk are moved by an axial moving force, which is converted by motor 13, with respect to wedge base plate 20 integrally formed with housing 60.

Figure 9:
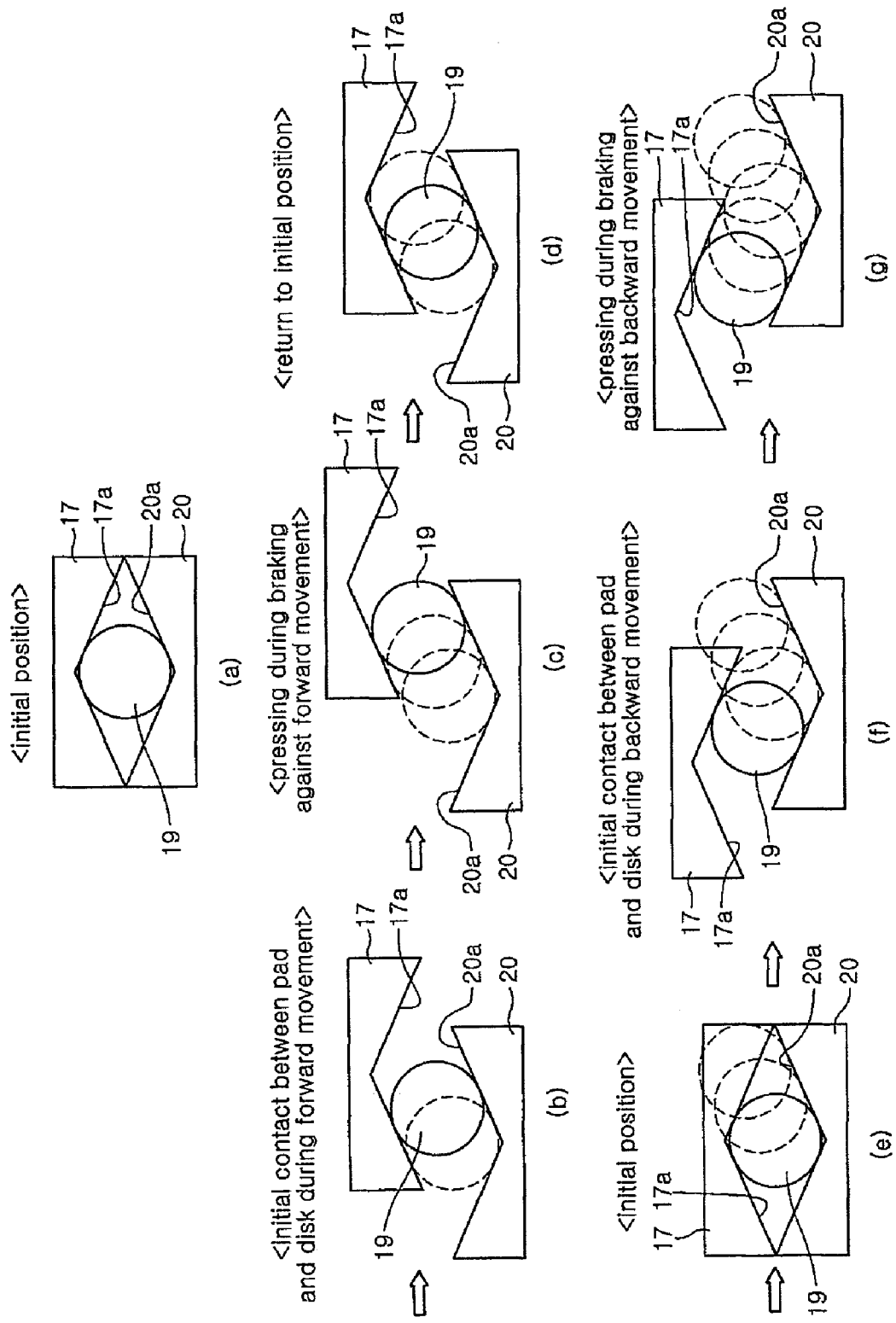
FIG. 9 is a view illustrating the wedge operation of the single motor electro wedge brake system during main braking.

For this reason, wedge roller 19, which is positioned at the central portion between rolling contact surfaces 17a and 20a of the moved wedge moving plate 17 and the fixed wedge base plate 20, generates a frictional force due to the movement of wedge moving plate 17 as shown in FIG. 9A.

After that, as wedge moving plate 17 is moved forward, wedge roller 19 is moved from the central portion between rolling contact surfaces 17a and 20a to the outside as shown in FIGS. 9B and 9C. The movement of wedge roller 19 with respect to rolling contact surfaces 17a and 20a causes wedge moving plate 17 to be further separated from wedge base plate 20.

Accordingly, wedge moving plate 17 is linearly moved and causes a clearance due to the change in position of wedge roller 19. The clearance between wedge moving plate 17 and wedge base plate 20 causes a wedge effect of wedge roller 19 where inner pad assembly 7 generates an input force pressing disk 5.

Subsequently, when braking is released, ECU 2 drives motor 13 in a reverse direction and allows wedge moving plate 17 to return to the initial position by linear motion converter 14, interlocking rod 15, and connecting rod 18 as shown in FIGS. 9D and 9E. Accordingly, wedge roller 19 also returns to the central position between rolling contact surfaces 17a and 20a. Therefore, a force pressing wedge moving plate 17 against disk 5 is released and a braking force is also released.

Further, even when a vehicle moving backward is braked, a vehicle is braked in the same manner as when a vehicle moving forward is braked. That is, ECU 2, which receives a signal of electric pedal 1 and perceives the reversing of a vehicle, drives motor 13 in a reverse direction (forward moving is referred to as driving in a normal direction).

Then, if linear motion converter 14, interlocking rod 15, and connecting rod 18 are pulled toward motor 13 by the reverse drive of motor 13, wedge moving plate 17 pulls inner pad assembly 7 in the same direction.

The pulling movement of wedge moving plate 17 causes wedge roller 19, which is positioned at the central portion between rolling contact surfaces 17a and 20a of the moved wedge moving plate 17 and the fixed wedge base plate 20, to move as shown in FIGS. 9F and 9G by a frictional force due to the movement of wedge moving plate 17.

That is, since wedge roller 19 is moved to the outside of rolling contact surfaces 17a and 20a, wedge moving plate 17 is further separated from wedge base plate 20. The clearance between wedge moving plate 17 and the wedge base plate causes an input force of inner pad assembly 7, which presses disk 5. Therefore, a braking force is generated.

Subsequently, when the braking is released, ECU 2 drives motor 13 in a normal direction and allows wedge roller 19 to return to the central position between rolling contact surfaces 17a and 20a as shown in FIG. 9E, thereby releasing the braking force.

Meanwhile, various additional functions of the EWB are implemented by adjusting unit 30, which is positioned at the central portion of wedge braking unit 16 and includes an NSL type screw interlocked with solenoid 41. The various additional functions will be classified and described below.

First, the Fail-Safe function releases the pressing of wedge braking unit 16 when wheel jamming of wedge roller 19 occurs or motor 13 is broken down in the braking state. The Fail-Safe function will be described. ECU 2 turns off solenoid 41 and releases the restraint on adjusting unit 30. Accordingly, a force, which is applied to disk 5 by the pad and wedge braking unit 16, is released to prevent a vehicle from abnormally operating due to an undesired braking force.

That is, as shown in FIG. 10A, switching lever 43 is engaged with latch 31a of push rod shaft 31, so that solenoid 41 turned on in a normal braking state restrain push rod shaft 31. Accordingly, push rod shaft 31 supports wedge roller 19, which is in the braking state. For this reason, a wedge effect of wedge roller 19 where an input force pressing disk 5 is generated is not released and a braking state is maintained.

However, if ECU 2 perceives the broken-down of motor 13 or wheel jamming, ECU 2 turns off solenoid 41 to separate switching lever 43 from latch 31a and releases the restraint of push rod shaft 31, as shown in FIG. 10B, even though ECU 2 perceives as a Fail-Safe state.

Due to the release of the restraint of push rod shaft 31, a force is applied to push rod shaft 31 by spring 35, and the force applied by spring 35 moves forward push rod shaft 31 while rotating push rod shaft 31 that is fixed using supporting nut 32 and the NSL type screw.

As described above, when the restraining force of solenoid 41 is released, a reaction force is applied from the pad (inner pad assembly 7) to push rod shaft 31 moved forward by the force of spring 35.

That is, a reaction force, which is transmitted through inner pad assembly 7 and wedge moving plate 17 and wedge roller 19 and wedge base plate 20, is applied to push rod shaft 31.

Push rod shaft 31 to which a reaction force is applied is moved toward supporting nut 32, and releases the wedge effect of wedge roller 19 for maintaining the braking force between the pad and disk 5. Accordingly, the state of a vehicle is converted into a Fail-Safe state where undesired braking is abnormally performed during braking.

The release or restraint of solenoid 41 with respect to push rod shaft 31 is different depending on the structure of the switching lever. In FIG. 3, when the state of solenoid 41 is converted from a turning-on state to a turning-off state, movable shaft 42 of solenoid 41 is retreated and a force pressing switching lever 43 is released, that is, a downward moving force, which is caused by the contact between the contact slope of switching lever 43 and movable shaft 42 of solenoid 41, is released.

Subsequently, as press part 44 is lifted, the contact part 45 of switching lever 43 to which a force is not applied by solenoid 41 is rotated about the hinge point and separated from latch 31a of push rod shaft 31. Therefore, the engagement between switching lever 43 and latch 31a is released.

Further, in FIG. 4 showing the modification of the solenoid, solenoid 401 is turned off and a force applied by movable shaft 402 is released in the axial direction of switching lever 403. Accordingly, switching lever 403 angularly moves about the hinge point, and contact part 405 is separated from latch 31a of push rod shaft 31. As a result, the engagement between switching lever 403 and latch 31a is released.

Meanwhile, the function for maintaining a set clearance of a pad among various additional functions implemented by the EWB is a function for always maintaining a clearance that is set between the pad and disk 5 at initial assembling, and may be implemented in various ways. For example, the function for maintaining a set clearance may be implemented in the following manner. That is, an adjustment for maintaining the set clearance is performed by adjusting a clearance between the pad and disk 5 whenever an engine is started. Alternatively, ECU 2 detects pad abrasion and compensation is then performed to maintain a set clearance between the pad and disk 5.

Figure 12:
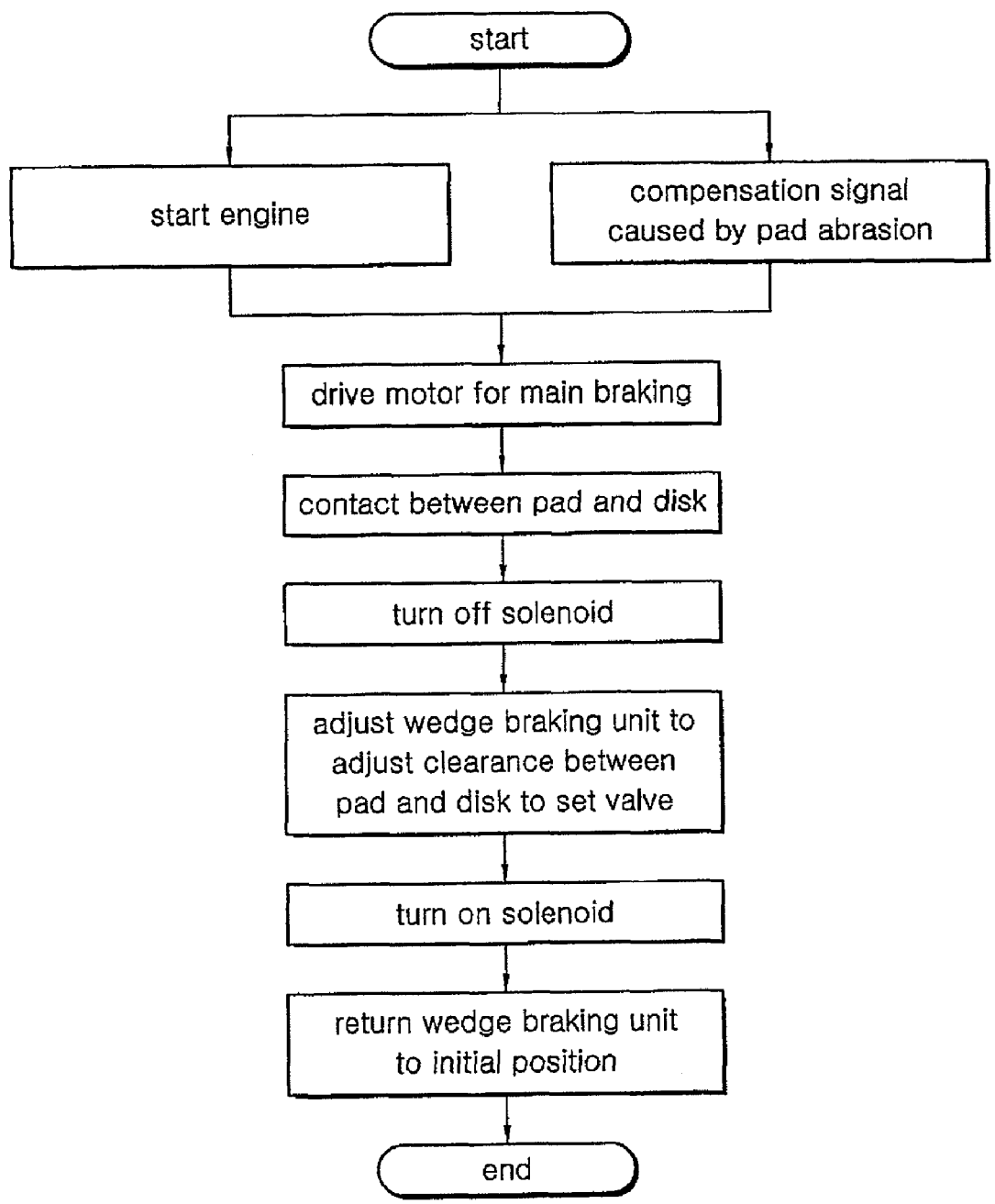
FIG. 12 is a flowchart illustrating compensation of the operation for maintaining the set clearance of the pad.

When the adjustment for maintaining an initial set clearance between disk 5 and the pad is performed in the starting of the engine, as shown in FIG. 12, the engine is started and ECU 2 drives motor 13. The drive of motor 13 causes wedge moving plate 17 to move by linear motion converter 14, interlocking rod 15, and connecting rod 18, like the main braking. Therefore, inner and outer pad assemblies 7 and 8 come in close contact with the both surfaces of disk 5.

That is, if wedge moving plate 17 of wedge braking unit 16 is moved together with inner pad assembly 7 by the driving force of motor 13, as shown in FIG. 11A, wedge roller 19 positioned between rolling contact surfaces 17a and 20a is moved by the frictional force between wedge moving plate 17 and the wedge base plate, like the main braking where push rod shaft 31 is restrained by solenoid 41. Due to the movement of wedge moving plate 17, inner and outer pad assemblies 7 and 8 come in close contact with the both surfaces of disk 5.

Since inner and outer pad assemblies 7 and 8 come in close contact with the both surfaces of disk 5 as described above, clearances between inner and outer pad assemblies 7 and 8 and disk 5 do not exceed the set clearance. Therefore, as shown in FIG. 11B, ECU 2 turns off solenoid 41 and then releases the solenoid restraining force of push rod shaft 31.

The release of the restraining force of push rod shaft 31 allows push rod shaft 31, which is an NSL type screw, to move in an axial direction. That is, while push rod shaft 31 is loosened from supporting nut 32 by the axial moving force that is applied by spring 35 provided between supporting nut 32 and push rod shaft 31, push rod shaft 31 is moved forward.

In this case, push rod shaft 31 is moved forward until the push rod shaft protrudes from supporting nut 32 by a distance A. The distance A is a clearance required for push rod shaft 31 to come in contact with and support wedge base plate 20 so that inner and outer pad assemblies 7 and 8 coming in close contact with the both surfaces of disk 5 are maintained. The distance A is changed depending on the specification of the single motor electro wedge brake.

As described above, wedge base plate 20, wedge roller 19, and wedge moving plate 17 are maintained as shown in FIG. 11B. Further, after push rod shaft 31, which is moved forward, comes in contact with wedge base plate 20, ECU 2 drives motor 13 again to move wedge moving plate 17 so that the set clearance is secured between the pad and disk 5.

In this case, when a clearance between the pad and disk 5 is larger than the set clearance, ECU 2 drives motor 13 (referred to as normal rotation) to further move wedge moving plate 17 so that the clearance between the pad and disk 5 corresponds to the set clearance.

However, when the clearance between the pad and disk 5 is smaller than the set clearance, ECU 2 drives motor 13 (referred to as reverse rotation) to pull wedge moving plate 17 (movement in an opposite direction to the moving direction when braking) so that the clearance between the pad and disk 5 corresponds to the set clearance.

The control of the drive of motor 13, which is performed by ECU 2, allows the clearance between the pad and disk 5 to always correspond to the set clearance whenever the adjustment is performed.

Subsequently, ECU 2 turns on solenoid 41 and allows switching lever 43 to be engaged with latch 31a so that the state of push rod shaft 31, which is moved forward by a distance A, is converted into the stationary state as shown in FIG. 11C. That is, since movable shaft 42 of solenoid 41 allows switching lever 43 to rotate about the hinge point, the contact portion 45a is engaged with latch 31a.

After the state of push rod shaft 31 is converted into a stationary state by solenoid 41 as described above, ECU 2 converts the states of wedge base plate 20, wedge roller 19, and wedge moving plate 17 into the initial states by driving motor 13 in the reverse direction as shown in FIG. 11C. Accordingly, clearances between inner and outer pad assemblies 7 and 8 and disk 5 do not exceed the set clearance. Therefore, it is possible to maintain a constant braking force by the wedge effect of wedge roller 19, which is implemented during the braking.

The starting of the engine and processes for maintaining a clearance of a pad are not performed at the same time. Further, when ECU 2 perceives pad abrasion, processes for maintaining a clearance are also similarly performed. However, except for only whether the starting of the engine and the drive of motor 13 are performed at the same time, all of the processes are similarly performed by a procedure shown in FIG. 12.

That is, if ECU 2 determines that the pad is abraded and the clearance between the pad and disk 5 is more than the set clearance on the basis of information from a sensor for measuring the amount of the pad abrasion, ECU 2 drives motor 13 to allow inner and outer pad assemblies 7 and 8 to come in close contact with the both surfaces of disk 5, similar at the start of the engine.

Accordingly, wedge roller 19 positioned on the rolling contact surface 20a of wedge base plate 20 is moved together with wedge moving plate 17 as shown in FIG. 11B. As a result, clearances between inner and outer pad assemblies 7 and 8 and disk 5 do not exceed the set clearance.

Subsequently, ECU 2 turns off solenoid 41 and allows push rod shaft 31 to move forward in the axial direction by spring 35. After that, ECU drives motor 13 again to move wedge moving plate 17 so that the close contact is secured between the pad and disk 5.

After performing the above-mentioned operations, as shown in FIG. 11C, ECU 2 turns on solenoid 41 to convert the state of push rod shaft 31 into a stationary state and drives motor 13 in the reverse direction so as to be in the initial state. For this reason, since the set clearance is again maintained between disk 5 and the pad, it is possible to maintain a constant braking force during braking.

Further, if the set clearance of the pad is maintained when ECU 2 perceives the pad abrasion, it is convenient to maintain the clearance of the pad and to find out the time to replace the pad. That is, when the pad is abraded over a predetermined level, the perception of the pad abrasion by ECU 2 can be used as information for informing a driver of the time to replace the pad.

Meanwhile, as the state of solenoid 41 is converted into a turning-off state, the function for maintaining braking, which is implemented by the EWB during the operation of the electric parking brake, is implemented by restraining push rod shaft 31 with EPB spring 50.

That is, when ECU 2 perceives the conversion into the parking braking state (a method of transmitting a signal to ECU by using a button or methods similar thereto are used), ECU 2 turns off solenoid 41 to allow switching lever 43 to be separated from latch 31a, thereby releasing the restraint of push rod shaft 31.

As the restraint is released by solenoid 41 as described above, push rod shaft 31 to which the force of spring 35 is applied is loosened from supporting nut 32 and moved forward. The forward movement of push rod shaft 31 causes rear bearing 34 to push wedge base plate 20. Accordingly, wedge moving plate 17 at which wedge roller 19 is positioned and inner pad assembly 7 fixed thereto are pushed against disk 5.

Subsequently, when the pad and disk 5 come in contact with each other due to the forward movement of push rod shaft 31, which is caused by turning-off solenoid 41, ECU 2 drives motor 13 to maintain the braking force.

That is, if wedge moving plate 17 is moved by the sequential operations of linear motion converter 14, interlocking rod 15, and connecting rod 18, which are caused by the drive of motor 13, wedge moving plate 17 pushes inner pad assembly 7 against disk 5.

As wedge moving plate 17 is moved as described above, wedge roller 19 is moved by wedge moving plate 17 and a frictional force. The movement of wedge roller 19 generates an input force pressing wedge moving plate 17 against disk 5.

As shown in FIG. 13B, the movement of wedge roller 19 causes wedge moving plate 17, which is moved by a distance B by push rod shaft 31, to move by a distance C. Accordingly, inner pad assembly 7 fixed to wedge moving plate 17 presses disk 5. As a result, a parking brake force is generated.

The wedge moving plate is further moved during the parking braking, as compared to the main braking. That is, for example, as shown in FIGS. 13A and 13B, a moving distance B of wedge moving plate 17, which is moved due to the movement of wedge roller 19, is 2 mm maximum during the main braking. Further, a moving distance C of wedge moving plate 17 is larger than the moving distance B by 0.8 mm during the parking braking, and a parking brake force is maintained. The additional movement is caused by the axial movement of wedge moving plate 17, which is moved by motor 13.

In this case, the above-mentioned distance (2 mm or 0.8 mm) is different depending on the design specification of the wedge caliper. The value of the distance is not limited to a specific value, and is only an example.

As described above, the pad is further moved by motor 13 to perform the parking braking, and push rod shaft 31 is also moved forward. Then, push rod shaft 31, which is moved forward, maintains a restraining force by EPB spring 50 instead of solenoid 41 that is turned off.

That is, if EPB spring 50 is moved together with wedge moving plate 17 that is moved by motor 13, press portion 53 of EPB spring 50 is positioned on rear bearing 34 of push rod shaft 31.

The movement of EPB spring 50 allows press portion 53 to press rear bearing 34 due to its own electric force. Further, the force of EPB spring 50 is converted into the restraining force applied to push rod shaft 31 to which a restraining force is not applied by solenoid 41, and restrains the movement of push rod shaft 31, thereby maintaining the braking force generated due to the operation of the parking brake.

Meanwhile, the restraint of push rod shaft 31, which is performed using the EPB spring, may be similarly performed by various modifications of the EPB spring. That is, according to the structure where press portion 153 of EPB spring 150 is bent inward, as shown in FIG. 7, if EPB spring 150 and wedge moving plate 17 are moved by motor 13 after the initial parking braking, press portion 153 of EPB spring 150 restrains the side of rear bearing 34 of push rod shaft 31. Accordingly, the movement of push rod shaft 31 is restrained, so that a braking force caused by the operation of the parking brake is maintained.

Further, in FIGS. 8A and 8B illustrating another modification where a parking brake force is maintained using the EPB spring, EPB spring 50 restrains EPB spring positioning flange 31c that is formed at the rear side of latch 31a of push rod shaft 31.

That is, if EPB spring 50 or 150 and wedge moving plate 17 moved by motor 13 are moved so as to generate a parking brake force, press portion 53 or 153 of EPB spring 50 or 150 is positioned at EPB spring positioning flange 31c of push rod shaft 31. Accordingly, push rod shaft 31, which is moved forward, is restrained by press portion 53 or 153 pressing EPB spring positioning flange 31c.

In this case, EPB spring 50 having press portion 53, which is bent outward, presses EPB spring positioning flange 31c of push rod shaft 31 from above to below. Further, EPB spring 150 having press portion 153, which is bent inward, presses EPB spring positioning flange 31c of push rod shaft 31 from side. Therefore, the restraint is maintained so that the parking braking state is maintained.

As described above, according to the present invention, an electro wedge brake (EWB) uses one motor to generate power, which is used to perform main braking during braking. The electro wedge brake uses a solenoid mechanism interlocked with the motor, so as to implement various additional functions, such as a function for maintaining a set clearance of a pad, a Fail-Safe function, and an EPB function. Accordingly, since only one motor for generating power is used, the size of the entire electro wedge brake can be reduced to improve the assembly property of the electro wedge brake.

Further, according to the present invention, the electro wedge brake implements various additional functions, such as a function for maintaining a set clearance of a pad, a Fail-Safe function, and an EPB function, by using one motor. For this reason, it is possible to reduce the number of parts related to the motion conversion, which are required when a motor is used. Therefore, it is possible to reduce manufacturing cost and weight of the electro wedge brake.

Furthermore, according to the present invention, the electro wedge brake system implements a function for maintaining a set clearance of a pad, a Fail-Safe function, and an EPB function by using not a motor but a solenoid mechanism. Accordingly, it is possible to more simplify the structure for converting motion between related parts as compared to when a motor is used. Therefore, it is possible to easily design the electro wedge brake.

What is claimed is:

1. A single motor electro wedge brake system that uses a solenoid of a solenoid mechanism to implement additional functions, the single motor electro wedge brake system comprising:
   an electric pedal that is operated by a driver to brake a vehicle;
   an ECU that generates control signals by using information measured in the vehicle during braking of the vehicle;
   a plurality of wedge actuator assemblies, wherein each wedge actuator assembly comprises:
   a wedge caliper including inner and outer pad assemblies that cover a disk rotating together with a wheel and provided on opposing sides of the disk to press on the disk, and a torque member for performing an interlocking operation so that the outer pad assembly provided on the opposite side to the inner pad assembly is also moved toward the disk when the inner pad assembly is moved toward the disk;
   each wedge actuator assembly converting a torque, which is generated by a motor driven in normal and reverse directions by the ECU, into an axial motion to move the inner pad assembly toward the disk, thereby generating a self-energizing braking force by using a force applied to the disk caused by a movement of a wedge roller, and implementing a function for maintaining a set clearance between the inner and outer pad assemblies and the disk, and a Fail-Safe function, by using the forward movement of a push rod shaft screwed using a NSL (Non-Self Locking) type screw that is restrained or released on the basis of ON/OFF control of the solenoid mechanism interlocked with the motor controlled by the ECU; and
   a corresponding housing that receives a corresponding wedge actuator assembly and is fixed to the side of a corresponding wedge caliper,
   wherein an auxiliary power supply circuit comprises an auxiliary battery in the ECU, the motor of the corresponding wedge actuator assembly, and the solenoid.

2. The single motor electro wedge brake system according to claim 1, wherein the ECU controls the motor on the basis of signals of a pushing distance of the electric pedal, information about an attitude of a vehicle obtained from a yaw moment sensor provided in the vehicle, and information obtained by pad abrasion sensing sensors that are provided in the corresponding wedge caliper and the corresponding wedge actuator assembly fixed to the wedge caliper and load sensors that are used to prevent wheel jamming.

3. The single motor electro wedge brake system according to claim 1, wherein each of the wedge actuator assemblies includes:
   a braking motor unit that generates a braking force with power generated by the motor controlled by the ECU;
   a wedge braking unit that converts the torque of the motor into an axial motion to push the inner pad assembly against the disk, and converts the self-energizing, which is caused by the change in position of the wedge roller depending on the operation of the inner pad assembly from the disk, into an input force pressing the inner pad assembly against the disk; and
   the solenoid mechanism that is interlocked with the motor in order to implement a function for maintaining set clearances of the inner and outer pad assemblies, the Fail-Safe function against motor troubles, and an EPB function.

4. The single motor electro wedge brake system according to claim 3, wherein the braking motor unit includes:
   the motor that is fixed to one side of the housing by a fixed bracket fixed to the housing and is controlled by the ECU;
   a linear motion converter that is fixed to an output shaft of the motor and moves forward and backward in an axial direction depending on the drive of the motor; and
   an interlocking rod that is fixed to the linear motion converter and moves depending on the axial movement of the linear motion converter.

5. The single motor electro wedge brake system according to claim 4, wherein the interlocking rod is disposed so as to diagonally cross the housing at a position of the motor toward the opposite side thereto, and the interlocking rod is composed of a pair of pieces and fixed to upper and lower portion of the linear motion converter.

6. The single motor electro wedge brake system according to claim 3, wherein the wedge braking unit includes:
   a connecting rod fixed to the motor so that an axial moving force caused by the drive of the motor is applied to the connecting rod;
   a wedge moving plate that is moved by an integrally formed connecting rod so as to press the inner pad assembly, which is positioned on the opposite side to the outer pad assembly, that is, on the side of the disk, against the disk;
   a wedge base plate that is arranged parallel to the wedge moving plate so as to face the wedge moving plate, thereby defining a pair of plates; and
   the wedge roller being provided between rolling contact surfaces formed on the pair of plates and generating a frictional force during the movement of the wedge moving plate.

7. The single motor electro wedge brake system according to claim 6, wherein an interlocking rod is formed on and below the wedge moving plate.

8. The single motor electro wedge brake system according to claim 6, wherein the wedge roller has a cylindrical shape.

9. The single motor electro wedge brake system as defined in claim 6, wherein the wedge base plate is formed using a part of the housing fixed to the side of the wedge caliper, and is stationary with respect to the wedge moving plate that is moved by power of the motor.

10. The single motor electro wedge brake system according to claim 3, wherein the solenoid mechanism includes:
    an adjusting unit that includes the push rod shaft fixed using the NSL (Non-Self Locking) type screw and is moved toward the disk in an axial direction when the function for maintaining a set clearance between the inner and outer pad assemblies and the disk, and the Fail-Safe function are implemented;
    a solenoid unit that is turned on or off to operate the adjusting unit and releases or applies a restraining force; and
    an EPB spring fixed to the wedge moving plate moved by the motor so that the push rod shaft is restrained to maintain a parking braking performance during the operation of the electric parking brake.

11. The single motor electro wedge brake system according to claim 10, wherein when torque of the motor driven by the ECU at the start of an engine is converted into a linear motion and the wedge moving plate generating a wedge effect by the wedge roller is moved, the ECU turns off the solenoid of the solenoid unit so that the restraint of the adjusting unit, which maintains the contact between the inner and outer pad assemblies and the disk, on the push rod shaft is released, the ECU drives the motor again to move the wedge moving plate so that the set clearance is secured between the inner and outer pad assemblies and the disk, and turns on the solenoid so as to restrain the push rod shaft, and the ECU drives the motor in a reverse direction to allow the wedge moving plate to return to an initial state, thereby implementing the function for maintaining the set clearance of the inner and outer pad assemblies by using the solenoid mechanism.

12. The single motor electro wedge brake system according to claim 11, wherein when perceiving that a measured clearance exceeds the set clearance by measuring the amount of pad abrasion, the ECU drives the motor to implement the function for maintaining the set clearance of the inner and outer pad assemblies by using the solenoid mechanism.

13. The single motor electro wedge brake system according to claim 10, wherein the adjusting unit is disposed at a central portion of an initial position of the inner pad assembly so that a force applied by the push rod shaft is uniformly transmitted to the inner pad assembly.

14. The single motor electro wedge brake system as defined in claim 10, wherein the adjusting unit includes:
a supporting nut that includes locking portions formed on the outer periphery thereof and is fitted to position restraining portions of the housing;
the push rod shaft that includes a push rod screw formed on the outer periphery thereof so as to be screwed to the supporting nut in non-self locking type;
a latch that is formed on the outer periphery of a portion of the push rod shaft without the push rod screw;
front and rear bearings that are disposed on the push rod shaft at corresponding front and rear sides of the latch; and
a spring of which one end is fixed to the supporting nut and the other end continuously applies an axial force to the front bearing.

15. The single motor electro wedge brake system according to claim 14, wherein the front bearing is formed of a needle bearing, which withstands an axial force and does not restrain rotation, and
the rear bearing is formed of a thrust bearing.

16. The single motor electro wedge brake system according to claim 14, wherein when being in initial assembling, the spring is provided between the supporting nut and the front bearing so as to continuously apply a force to the front bearing.

17. The single motor electro wedge brake system according to claim 10, wherein the solenoid unit includes:
the solenoid that is received at one side in the housing and turned on or off by the ECU; and
a switching lever that operates like a seesaw about a hinge shaft by a movable shaft protruding or retreating during the operation of the solenoid.

18. The single motor electro wedge brake system according to claim 17, wherein the switching lever includes:
a press part that is positioned so as to correspond to the moving path of the movable shaft of the solenoid,
a latch contact part that is bent from the end of the press part hinge-attached to the housing and rotates about a hinge point; and
a contact portion that is formed on the outer surface of the latch contact part so as to be engaged with the latch formed on the push rod shaft;
wherein the switching lever includes a contact slope inclined along the longitudinal direction of the press part so as to generate a force applied downward about the hinge point when a force is applied to the press part by the movable shaft of the solenoid.

19. The single motor electro wedge brake system according to claim 10, wherein the solenoid unit includes:
the solenoid that is received at one side in the housing and turned on or off by the ECU; and
a switching lever that angularly moves about a hinge shaft by a movable shaft protruding or retreating during the operation of the solenoid.

20. The single motor electro wedge brake system according to claim 19, wherein the switching lever includes:
a press part that is positioned so as to correspond to the moving path of the movable shaft of the solenoid,
a latch contact part that is perpendicularly formed at the end of the press part and hinge-attached to the housing at the end thereof; and
a contact portion that protrudes from the latch contact part so as to be engaged with the latch formed on the push rod shaft.

21. The single motor electro wedge brake system according to claim 10, wherein the EPB spring includes:
a fixation portion that is fixed to the wedge moving plate;
a connection portion that is bent and extends so as to protrude from the fixation portion; and
a press portion that is bent downward from an end of the connection portion and generates a force so as to restrain the axial movement of the push rod shaft when the solenoid is turned off.

22. The single motor electro wedge brake system according to claim 21, wherein the press portion of the EPB spring is positioned at an upper portion of a rear bearing disposed on the push rod shaft so that the press portion of the EPB spring presses the rear bearing provided on a side of a latch of the push rod shaft to generate a restraining force.

23. The single motor electro wedge brake system according to claim 21, wherein the press portion of the EPB spring is positioned at a side of a rear bearing disposed on the push rod shaft so that the press portion of the EPB spring pushes the rear bearing provided on a side of a latch of the push rod shaft to generate a restraining force.

24. The single motor electro wedge brake system according to claim 21, wherein EPB spring includes an EPB spring positioning flange, which is formed at a rear side of a latch of the push rod shaft and presses the press portion, so that press portion directly presses the push rod shaft to generate a restraining force.

* * * * *